Aug. 26, 1952     T. H. LANDGRAF ET AL     2,608,349
CONTROL APPARATUS FOR HEATING PLANTS
Filed May 11, 1950
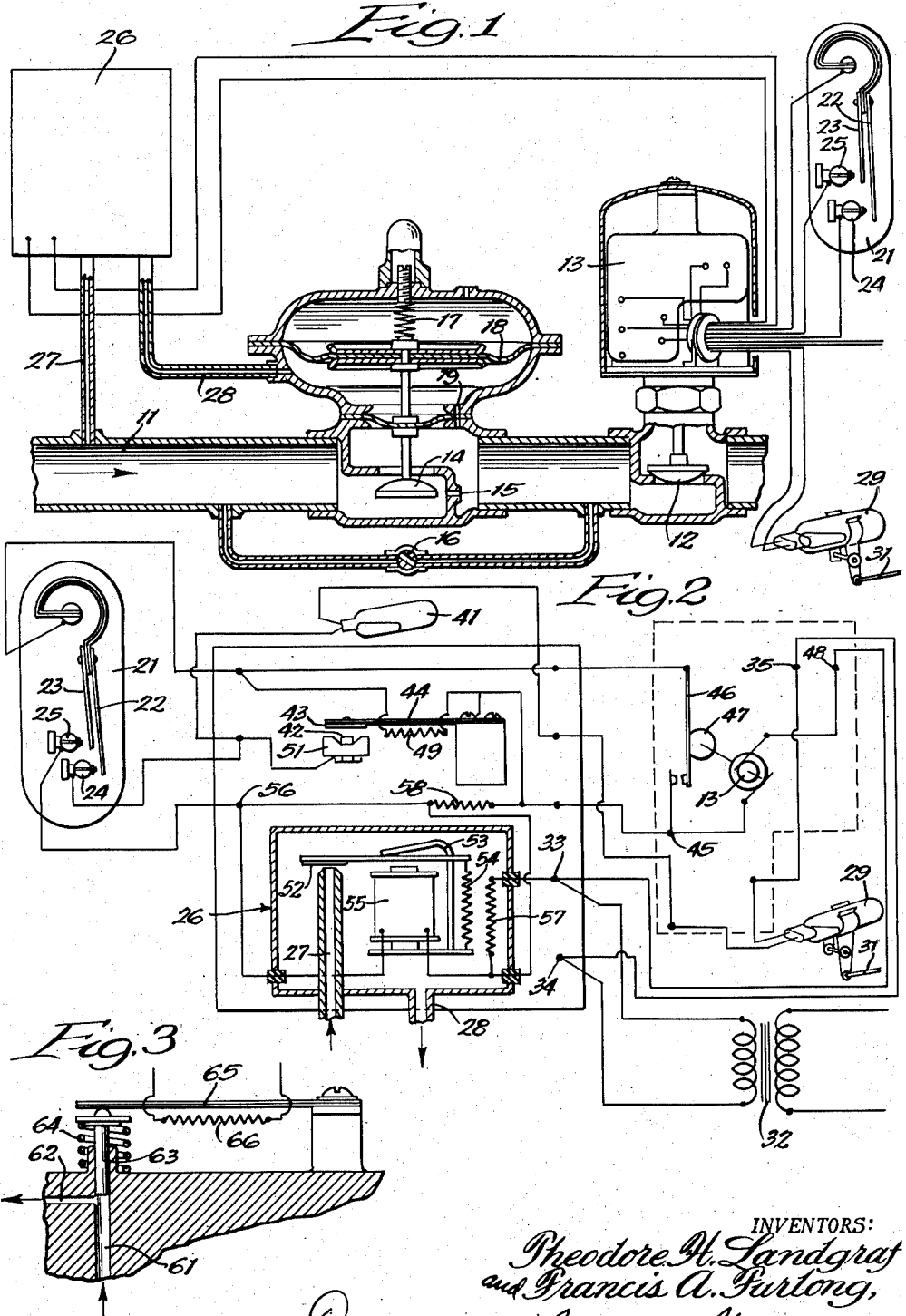
INVENTORS:
Theodore H. Landgraf
and Francis A. Furlong,
BY ATTORNEYS.

Patented Aug. 26, 1952

2,608,349

UNITED STATES PATENT OFFICE 2,608,349

CONTROL APPARATUS FOR HEATING PLANTS

Theodore H. Landgraf, Aurora, and Francis A. Furlong, Chicago, Ill., assignors to Autogas Company, Chicago, Ill., a company Application May 11, 1950, Serial No. 161,428

7 Claims. (Cl. 236—1)

This invention relates to control apparatus for heating plants and more particularly to apparatus for controlling a space heating furnace employing a fluid fuel.

In space heating the optimum type of control would be one in which exactly the right amount of heat is supplied to the space under all external conditions exactly to balance the heat losses, thereby to maintain the space at exactly uniform temperature at all times. This exact type of control is impractical, especially for domestic heating, since it would be far too complicated and expensive. It is desirable, however, to approach the optimum as closely as practical limits will permit.

One arrangement which has been used successfully is disclosed and claimed in the patent to Furlong No. 2,164,511. In this arrangement two preset rates of fuel supply are provided and one or the other is selected depending on the demand as measured by a thermostat. In this system the heating plant is started with high input when a predetermined low temperature is reached and changes to low input as the temperature rises and finally is shut off when the temperature reaches a predetermined higher value. The present invention has for one of its objects to provide certain improvements in this system to maintain a more uniform temperature under extremely mild conditions and to insure high input immediately in the event of a rapid temperature drop.

Another object is to provide a control apparatus in which low input will be provided as soon as a predetermined high temperature is reached and will be maintained until the temperature rises above said high temperature or drops below a predetermined lower temperature. According to one feature of the invention, a time lag snap acting control is provided to control starting and shut off to insure a minimum period of operation each time the predetermined high temperature is reached. According to another feature, provisions are made to insure immediate starting at high input any time the temperature falls below the predetermined lower temperature.

The above and other objects and features of the invention will be more readily apparent from the following description when read in connection with the accompanying drawing, in which:

Figure 1 is a diagrammatic view with parts shown in section through a fuel conduit and control valve to which the control apparatus of the present invention is applied, Figure 2 is a circuit diagram of the control apparatus of the invention, and Figure 3 is a partial sectional view illustrating a modified construction.

As shown in Figure 1, fluid fuel such as gas is supplied to a heating furnace through a main supply conduit 11 from any suitable source. A main valve 12 is provided in the conduit controlled by an electric motor 13 which opens the valve 12 when energized and allows the valve to close under the influence of a spring or the like when the motor is de-energized. This type of motor is a standard commercial unit and will not be described herein in detail. When the valve is open, fuel will be supplied to the furnace and when it is closed the supply of fuel will be interrupted, except that ordinarily a pilot burner is provided supplied through a bypass around the valve 12 for automatically igniting the main burner when the valve 12 is opened.

In addition to the main valve 12, a secondary control valve 14 is provided in the conduit 11. A bypass 15 is provided around the valve 14 and an additional adjustable bypass 16 may be provided to adjust the amount of fuel which will flow past the valve 14 when it is closed. The valve 14 corresponds to the similar modulating valve more particularly described and claimed in Patent No. 2,164,511 and, as shown, is urged open by a spring 17 and is closed by a diaphragm 18 when pressure is supplied to the lower side of the diaphragm. A small bleed passage 19 extends from the space below the diaphragm 18 to the furnace side of the valve 14 to prevent trapping of actuating fluid beneath the diaphragm.

The motor 13 is controlled by a room thermostat 21 having a pair of blades 22 and 23 to engage fixed contacts 24 and 25 at different temperatures. The thermostat is connected in a control circuit to the motor 13 and to a control apparatus indicated generally at 26, to control the supply of actuating fluid to the diaphragm 18. Preferably the fuel supplied to the furnace is utilized as the actuating fluid, and for this purpose the main conduit 11 is connected through a pipe 27 to the control mechanism 26, which is in turn connected through a pipe 28 to the space below the diaphragm 18. When fuel flows through the pipes 27 and 28, the diaphragm 18 will be subjected to pressure to close the valve 14, while when there is no flow through these pipes, the pressure will bleed off through the opening 19 to allow the valve 14 to open. The control circuits preferably go through a pilot operated switch 29, which is shown as a mercury switch tilted through a pilot control thermostat by means of a link 31 so that the main valve cannot be opened except when the pilot is burning.

The control circuit is illustrated in detail in Figure 2 and may be energized from any suitable source of supply such as a transformer 32. As shown, the transformer secondary is connected to terminals 33 and 34 and the terminal 34 is connected directly to a motor terminal 35, which is connected through the pilot switch 39 and a limit control switch 41 to the thermostat contact 24. The limit control switch 41 may be operated in response to a limit control on the furnace to be normally closed but to open when the furnace exceeds a predetermined temperature. The limit control switch circuit is also connected to a contact 42 adapted to be engaged by a contact 43 carried by a bimetal strip 44 when the strip 44 is heated. The strip 44 is connected to a terminal 45 on the motor which leads to one side of the motor 13 and also to one terminal of a holding switch 46 actuated by the motor through a cam 47. The other side of the motor is connected to a terminal 48, which is in turn connected to the supply terminal 33.

The bimetal strip 44 is heated by a resistance heater element 49 connected at one side to the terminal 45 and at its other side to the common or center terminal of the thermostat. According to one feature of the invention the switch 43 is adapted to remain closed for a predetermined period of time once it is closed. For this purpose the contact 43 is formed by a disc of magnetic material and a small magnet 51 is mounted adjacent to the contact 42. When the strip 44 is heated sufficiently to move the contact 43 almost into engagement with the contact 42, the magnet 51 will deflect the strip and bring the contacts firmly into engagement with no chattering. As the bimetal strip cools and tends to move the contact 43 away from the contact 42, the magnet 51 will hold the strip deflected with the contacts in engagement until it reaches a temperature lower than that at which the contacts initially engage and will then release the contact 43 so that it will spring cleanly away from the contact 42 with a snap action. This construction, therefore, provides for snap action engagement and disengagement and insures that the circuit through these contacts will remain closed for a predetermined minimum time interval. The center contact of the thermostat is also connected to the holding switch 46, as shown, which is in parallel with the heater 49 so that when the holding switch is closed no current will flow through the heater and it will cool off.

To open the valve 14 for high fuel supply, the control mechanism is provided, which may be constructed as best seen in Figure 2. As shown, the pipe 27 extends into a closed housing to which the pipe 28 is connected and terminates in a nozzle portion adapted to be engaged by a flapper 52. The flapper 52 is pivotally mounted on a bracket 53 and is normally urged away from the nozzle by a spring 54. In this condition the nozzle will be open so that gas or other fuel under pressure can flow through the control unit to raise the diaphragm 18 and close the valve 14.

To close the nozzle a solenoid 55 is provided to attract the flapper 52 and seat it against the nozzle. One side of the solenoid is connected to a terminal 56, which is connected to the contact 25 of the thermostat. The other side of the solenoid is connected through a resistance 57 to the supply terminal 33 and also through a resistance 58 to the terminal 45. Preferably the terminal 56 is connected through the resistance 58 to the terminal 45 as shown, for a purpose to appear more fully hereinafter.

In operation of the system, when the temperature is above the maximum limit for which the thermostat is set, say, for example, 72°, both thermostat contacts will be open and the motor will be de-energized so that the valve 12 is closed and no fuel is supplied to the furnace. When the temperature drops to the upper setting limit, the blade 22 will engage the contact 24 to complete a circuit from the power terminal 34 to terminal 35 through the switches 29 and 41 to the thermostat contact 24 and blade 22 and through the heater 49 to the terminal 45. This circuit is completed through the motor to the terminal 48 and the power input terminal 33, but the resistance of the heater 49 is such that the motor will not operate. As the heater heats the blade 44, the contact 42 will engage the contact 43 to complete a circuit from the limit switch 41 parallel to the circuit through the thermostat to the terminal 45. Since this is a low resistance circuit, the motor will be energized to open the valve 12 and initiate the supply of fuel to the furnace.

As soon as the motor turns, the cam 47 will close the holding switch 46 to complete a holding circuit parallel to the last described circuit from the terminal 35 through the switches 29 and 41, through the thermostat and switch 46 to the terminal 45. This is also a low resistance circuit and supplies enough current to the motor to maintain it in its energized position with the valve 12 open. It is noted that this circuit includes the thermostat contact 24 and blade 22 so that the motor will be energized only as long as these thermostat contacts are closed or while the switch 42, 43 in parallel therewith is closed. Therefore, after an interval sufficient for the switch blade 43 to move out of engagement with the contact 42, the motor circuit will be interrupted to close the valve 12 whenever the temperature rises above the upper limit for which the blade 22 is set.

Upon a further decrease in temperature, for example, to 70°, the thermostat blade 23 will engage the contact 25 to complete a circuit from the terminal 33 through the resistance 57, solenoid 55, thermostat contact 25, contact 24, switches 41 and 29, and terminal 35, to the power input terminal 34. This will energize the solenoid 55 to close the pipe 27 so that pressure below the diaphragm 18 will be dissipated and the valve 14 will be open. This increases flow of fuel to the furnace to high input and the furnace will remain at high input as long as the contact 23 is in engagement with the thermostat terminal 25. As soon as this contact is broken upon a rise in temperature, the solenoid 55 will be de-energized, allowing the valve 52 to open so that the valve 14 will be closed and the furnace will return to its low input condition. Thus the furnace is normally started at low input and remains on low input as long as the temperature is below that for which thermostat blade 22 is set and above that for which blade 23 is set. In extremely mild weather, the blade 23 will normally never close, so that the furnace cycles between low input and its "off" condition. In more severe weather, the furnace may operate normally at low input and increase to high input as required to maintain the predetermined minimum temperature.

Upon a sudden drop in temperature, such as to close both of the thermostat blades 22 and 23 quickly, it is desired to start the furnace immediately at high input rather than waiting for heating of the blade 44 by the heater 25. The connection between the terminal 56 and the resistor 58 makes this possible. Under these conditions, with both blades closed, there are parallel circuits from the terminal 45 through the heater 49 to the thermostat and through the resistor 58 and terminal 56 to the thermostat contact 25. This connects the heater 49 and resistor 58 in parallel and their parallel resistance is low enough to permit operating current to flow through the motor 13 to open the valve 12. At the same time the solenoid 55 is energized to close the pipe 27 so that the valve 14 will open for high input. It is noted that the furnace is started under these conditions without waiting for heating of the blade 44 and starts at high input. Under all other normal operating conditions the furnace starts under low input and remains at low input until the temperature has dropped sufficiently to close the blade 23.

Figure 3 illustrates an alternative construction of the control valve unit for controlling supply of fuel under pressure to the diaphragm 18. As shown, fuel normally flows from the supply conduit ahead of the valves through a passage 61 and flows out through a passage 62 to the diaphragm 18. The passage 62 may be closed by a plunger 63 which is normally urged upward by a spring 64 to leave the passage open. The plunger 63 is moved down by a bimetal strip 65, heated by a resistance heater 66, which may be connected in the circuit in place of the solenoid 55. In this circuit the resistance 57 may be omitted, since its place is taken by the heater 66 and the right side of the heater may be connected directly to the terminal 45 rather than through the resistance 58 as shown. Otherwise this construction functions in the same manner as that of Figures 1 and 2.

While two embodiments of the invention have been shown and described in detail, it will be understood that they are illustrative only and are not to be taken as a definition of the scope of the invention, reference being had for this purpose to the appended claims.

What is claimed is:

1. Control apparatus for a heating plant using fluid fuel and having a main on-off valve controlling the supply of fuel comprising an auxiliary fuel control device controlling the supply of fuel and having a normal low position in which a relatively small quantity of fuel is supplied and a high position in which a greater quantity of fuel is supplied, a thermostat responsive to the temperature of the space to be heated, means in the auxiliary device normally to bias it to its low position, a first circuit closed by the thermostat at a predetermined temperature, means operated by the first circuit to open the main valve without affecting the auxiliary device, a second circuit closed by the thermostat at a lower temperature to adjust the auxiliary device to its high position, and a third circuit closed by the thermostat at said lower temperature to open the main valve independently of the operation of the said last named means.

2. Control apparatus for a heating plant using fluid fuel and having a main on-off valve controlling the supply of fuel comprising an auxiliary fuel control device controlling the supply of fuel and having a normal low position in which a relatively small quantity of fuel is supplied and a high position in which a greater quantity of fuel is supplied, a thermostat responsive to the temperature of the space to be heated, a switch to control the main valve, time delay means energized by the thermostat at a predetermined temperature to operate the switch to open the main valve, means operated by the main valve to hold it open as long as the thermostat is below said predetermined temperature and to deenergize the time delay means, and means operated by the thermostat at a lower temperature to control the auxiliary device.

3. Control apparatus for a heating plant using fluid fuel and having a main on-off valve controlling the supply of fuel comprising an auxiliary fuel control device controlling the supply of fuel and having a normal low position in which a relatively small quantity of fuel is supplied and a high position in which a greater quantity of fuel is supplied, a thermostat responsive to the temperature of the space to be heated, a switch to control the main valve, time delay means energized by the thermostat at a predetermined temperature to operate the switch to open the main valve, means operated by the main valve to hold it open as long as the thermostat is below said predetermined temperature, a circuit closed by the thermostat at a lower predetermined temperature to control the auxiliary device, and a second circuit closed by the thermostat at said lower temperature to open the main valve independently of said switch.

4. Control apparatus for a heating plant using fluid fuel and having a main on-off valve controlling the supply of fuel comprising an auxiliary fuel control device controlling the supply of fuel and having a normal low position in which a relatively small quantity of fuel is supplied and a high position in which a greater quantity of fuel is supplied, a thermostat responsive to the temperature of the space to be heated, a switch to control the main valve including a bimetallic strip which closes the switch when heated, a heater circuit for the strip energized by the thermostat when it is below a predetermined temperature, magnetic means tending to hold the switch closed, the switch and heater circuit being in parallel circuits including the main valve, a holding switch closed by the main valve when it is open and in series with the thermostat to hold the main valve open when the thermostat is below said predetermined temperature, and means operated by the switch at a lower temperature to control the auxiliary device.

5. Control apparatus for a heating plant using fluid fuel and having a main on-off valve controlling the supply of fuel comprising an auxiliary fuel control device controlling the supply of fuel and having a normal low position in which a relatively small quantity of fuel is supplied and a high position on which a greater quantity of fuel is supplied, a thermostat responsive to the temperature of the space to be heated, a switch to control the main valve including a bimetallic strip which closes the switch when heated, a heater circuit for the strip energized by the thermostat when it is below a predetermined temperature, magnetic means tending to hold the switch closed, the switch and heater circuit being in parallel circuits including the main valve, a holding switch closed by the main valve when it is open and in series with the thermostat to hold the main valve open when the switch is closed or the thermostat is below said predetermined temperature, the heater circuit having a high resistance such that the current through the main valve will be insufficient to operate it when only the heater circuit is closed, and a circuit in parallel to the heater circuit closed by the thermostat at a lower predetermined temperature and reducing the resistance in circuit with the main valve to the point where the main valve will be operated.

6. Control apparatus for a heating plant using fluid fuel and having a main on-off valve controlling the supply of fuel comprising an auxiliary fuel control device controlling the supply of fuel and having a normal low position in which a relatively small quantity of fuel is supplied and a high position in which a greater quantity of fuel is supplied, a thermostat responsive to the temperature of the space to be heated, the thermostat having a high contact to close at a predetermined temperature and a low contact to close at a predetermined lower temperature, a circuit between the high contact and the main valve including a resistance unit of sufficiently high resistance to prevent operation of the main valve when only said circuit is energized, a switch in shunt with the resistance unit to establish a main valve operating circuit, time delay means operated by the resistance unit when it is energized to close the switch, a holding switch closed by the opening of the main valve and in circuit with the high contact to hold the main valve open when either the high contact or the switch is closed, and a circuit controlled by the low contact to operate the auxiliary device.

7. Control apparatus for a heating plant using fluid fuel and having a main on-off valve controlling the supply of fuel comprising an auxiliary fuel control device controlling the supply of fuel and having a normal low position in which a relatively small quantity of fuel is supplied and a high position in which a greater quantity of fuel is supplied, a thermostat responsive to the temperature of the space to be heated, the thermostat having a high contact to close at a predetermined temperature and a low contact to close at a predetermined lower temperature, a circuit between the high contact and the main valve including a resistance unit of sufficiently high resistance to prevent operation of the main valve when only said circuit is energized, a switch in shunt with the resistance unit to establish a main valve operating circuit, time delay means operated by the resistance unit when it is energized to close the switch, a holding switch closed by the opening of the main valve and in circuit with the high contact to hold the main valve open when either the high contact or the switch is closed, a circuit controlled by closing of the low contact to adjust the auxiliary device to its high position, and another circuit controlled by closing of the low contact in parallel with said resistance unit to reduce the resistance in circuit with the main valve to the point where the main valve will be operated.

THEODORE H. LANDGRAF.
FRANCIS A. FURLONG.

REFERENCES CITED

The following references are of record in the file of this patent:

UNITED STATES PATENTS

| Number | Name | Date |
|---|---|---|
| 2,184,982 | Tornquist | Dec. 26, 1939 |
| 2,329,636 | McGrath | Sept. 14, 1943 |
| 2,355,436 | Hayter | Aug. 8, 1944 |
| 2,461,608 | Laing | Feb. 15, 1949 |